A. PHILLIPS.
BORING-MACHINE.
No. 174,849. Patented March 14, 1876.
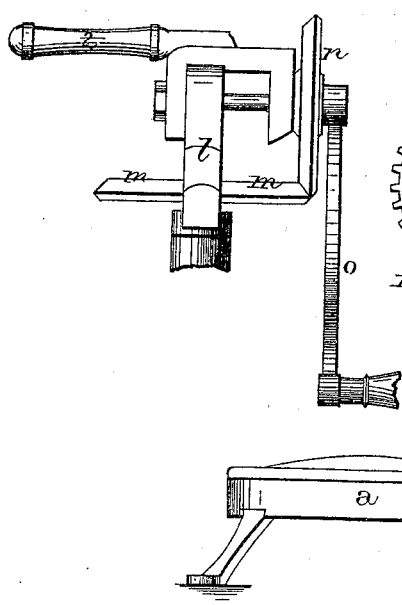
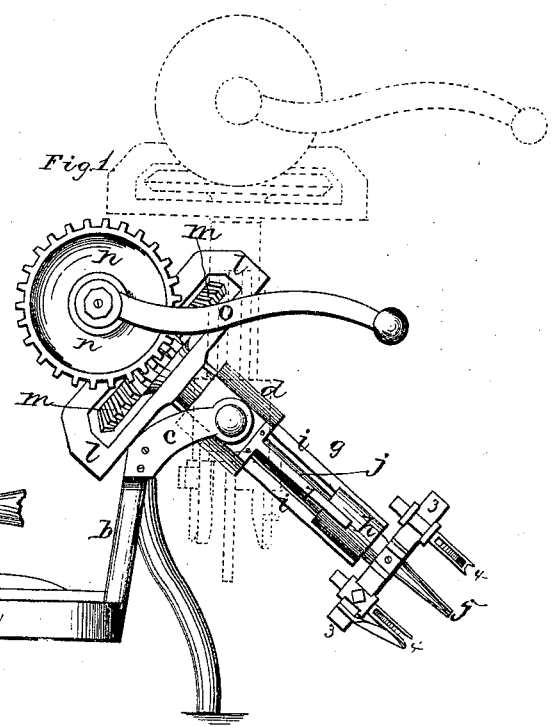
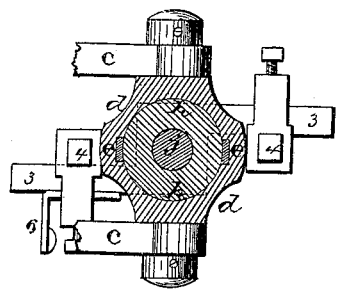
WITNESSES.
J. Wm. Garner
Frank M. Burnham.
INVENTOR
A. Phillips
per
F. A. Lehmann, Atty

UNITED STATES PATENT OFFICE.

ARTHUR PHILLIPS, OF UNION CITY, PENNSYLVANIA.

IMPROVEMENT IN BORING-MACHINES.

Specification forming part of Letters Patent No. 174,849, dated March 14, 1876; application filed December 13, 1875.

*To all whom it may concern:*

Be it known that I, ARTHUR PHILLIPS, of Union City, in the county of Erie and State of Pennsylvania, have invented certain new and useful Improvements in Boring-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in boring-machines, intended especially for boring bung-holes in barrels, but may also be used for boring other holes; and it consists in the arrangement and combination of parts that will be more fully described hereafter.

The accompanying drawings represent my invention. $a$ represents a suitable framework or seat, upon which the operator places one knee for the purpose of holding the machine in position, and steady, while at work. Secured to the top of the standard $b$, that rises from the front end of this frame, is a suitable double-pronged brace or support, $c$, in which is pivoted the guiding-sleeve $d$, which sleeve has the two grooves $e$ cut in its inner surface in order to prevent the frame $g$ from turning around in it. This frame $g$ consists of the two short cylinders $h$, that are connected together by the two bars $i$, and through, the center of which passes the drill-rod $j$. Secured to the upper cylinder $h$ is the frame $l$, inside of which, secured to the top of the drill-rod, is the beveled gear-wheel $m$, which receives its motion from the smaller wheel $n$, to which the handle $o$ is attached. Secured to the top of the frame $l$ is the rigid handle 2, by means of which the operator turns the auger at any desired angle, and draws the frame $g$ up through, or pushes it down through, the sleeve $d$, so as to advance the auger toward, or draw it away from, any object in which it is desired to bore the hole. Secured to the end of the rod $j$, by any suitable clamping devices, are the two bars 3, to which are adjustably attached the two cutting devices 4, that sweep around the auger-point 5, and cut out the bung-hole. In the rear of one or both of these cutters is placed a knife, 6, which follows the cutter around and finishes the hole out even and true. By adjusting these cutters in and out, the holes, whether bored in barrels, or any other wood or metal surfaces, can be cut any size desired, and by means of the pivoted guiding-sleeve can be cut at almost any angle desired. Secured to opposite sides of the sleeves are the metal rods 7, that project down a suitable distance on each side of the drill-rod, and by bearing upon the top of the article being bored prevent it from being raised up as the cutters are being drawn up out of the hole just bored.

Having thus described my invention, I claim—

The combination of the frame $a$, sleeve $d$, frames $g$ $l$, rod $j$, wheels $m$ $n$, handles 2 $o$, and suitable cutting devices, substantially as set forth.

In testimony that I claim the foregoing I have hereunto set my hand this 26th day of November, 1875.

ARTHUR PHILLIPS.

Witnesses:
   S. W. GRIFFITH,
   W. T. BOYD.